United States Patent [19]

Bardenheier

[11] Patent Number: 4,782,888

[45] Date of Patent: Nov. 8, 1988

[54] COMMUNITY THERMAL ENERGY EXCHANGE SYSTEM

[76] Inventor: Jean W. Bardenheier, 207 N. Glenroy Ave., Los Angeles, Calif. 90049

[21] Appl. No.: 887,900

[22] Filed: Jul. 21, 1986

[51] Int. Cl.$^4$ .............................................. F24F 3/00
[52] U.S. Cl. ................................. 165/22; 165/11.1; 237/13
[58] Field of Search ............... 237/13, 8 R, 56; 62/430, 434; 165/39, 40, 58, 61, 22, 11 R

[56] References Cited

U.S. PATENT DOCUMENTS

| | | |
|---|---|---|
| 1,896,774 | 2/1933 | Gebhardt . |
| 2,001,226 | 5/1935 | Viewegh ........................ 237/13 |
| 2,255,967 | 9/1941 | Collins . |
| 2,930,594 | 3/1960 | MacCracken . |
| 3,550,677 | 12/1970 | Knowles . |
| 3,838,813 | 10/1974 | Brosenius ...................... 237/13 |
| 3,926,743 | 12/1975 | Cywin . |
| 3,946,802 | 3/1976 | Christenson . |
| 3,986,344 | 10/1976 | Newman . |
| 4,006,857 | 2/1977 | Adrian . |
| 4,134,267 | 1/1979 | Hollemann ..................... 237/13 |
| 4,184,856 | 1/1980 | Thoren . |
| 4,315,597 | 2/1982 | Garraffa, Jr. . |
| 4,509,680 | 4/1985 | Lemmeke . |
| 4,522,253 | 6/1985 | Levin .............................. 237/2 B |

FOREIGN PATENT DOCUMENTS 3019198 11/1981 Fed. Rep. of Germany ........ 237/13

Primary Examiner—Henry A. Bennet
Attorney, Agent, or Firm—Christie, Parker & Hale

[57] ABSTRACT

A system of interconnecting a plurality of users of low grade thermal energy exchange has a number of users which are heat sources and a number of users which are heat sinks to balance heat flux. Heat is exchanged between a nontoxic primary heat transfer liquid and secondary heat transfer fluids for serving such users. The users are charged in proportion to the amount of heat transferred. Separate means are provided for selectively exchanging heat with the primary heat transfer liquid for maintaining the average temperature of the liquid within a desired temperature range. A municipal water main is a desirable source or sink of low grade thermal energy and nontoxicity of primary heat transfer liquid maintains the integrity of the water system.

30 Claims, 2 Drawing Sheets

COMMUNITY THERMAL ENERGY EXCHANGE SYSTEM

FIELD OF THE INVENTION

This invention relates to a public utility type of system for distribution of low grade thermal energy among a community of users.

BACKGROUND

Our industrial society has for many years used or proposed using sources and sinks of low grade thermal energy for a broad variety of purposes. For example, power plants, both nuclear and conventional, dissipate waste heat into rivers or other bodies of water. In that situation the river water which has a temperature in the same order of magnitude as the ambient environment acts as a sink of low grade thermal energy. In some industrial operations it is desirable to warm process streams, and fluids such as river water may be used as a source of low grade thermal energy. Ground water has been used for space heating or cooling; that is, as a source or sink of low grade thermal energy depending on its temperature relative to the surroundings. It has been proposed to use the low grade thermal energy in sewage to preheat air for space heating. It has been proposed to use domestic water as a sink of low grade thermal energy for cooling a refrigeration system. It takes little thought to recall scores of other applications of the low grade thermal energy exchange potential of fluids in the environment.

Heat exchange systems employing the low grade thermal energy potential of various fluids have been proposed or adopted without coordination, and ordinarily with little thought of the impact on other energy systems such as electrical utilities. To some extent this contributes to the electrical utilities' need for excess capacity to accommodate peak loads. It also results in somewhat ineffective utilization of the low grade thermal energy exchange potential of fluids that could desirably be used for heating and cooling.

The utilities that deliver domestic water have large quantities of liquid with excellent low grade thermal energy exchange potential flowing among the prospective users of such thermal energy exchange potential. One reason for not tapping this potential is the significant risk of hazard to public health and safety by uncontrolled access to a domestic water supply. It is, therefore, desirable to provide ways of effectively utilizing low grade thermal energy exchange potential already present in a community. It is desirable to employ low grade thermal energy exchange potential to alleviate usage of much higher grade energy such as electricity and fossil fuels.

BRIEF SUMMARY OF THE INVENTION

There is, therefore, provided in practice of this invention according to presently preferred embodiments a community thermal energy exchange system having a plurality of low grade thermal energy exchange users. A closed loop primary pipe system contains a primary heat transfer liquid. A plurality of heat exchangers are connected to the primary heat transfer pipe system, and secondary heat transfer fluids transfer heat between such heat exchangers and the system users. Means are provides for metering the quantity of heat transferred at such heat exchangers so that the users can be billed for their utilization of the energy exchange for recouping the system installation and operating costs.

In an exemplary system some of the users comprise heat sources which transfer heat to the primary heat transfer liquid by way of such a secondary heat transfer fluid. Other users comprise heat sinks which receive heat from the primary heat transfer liquid by way of such a secondary heat transfer fluid. Means are provided in the system for selectively exchanging heat separately with the primary heat transfer liquid for maintaining its temperature within a selected range. The primary heat transfer liquid may, for example, be maintained in selective heat exchange relation with a municipal water supply. By transferring heat to or from such users by way of a nontoxic primary heat transfer liquid, integrity of the water supply can be maintained while utilizing the low grade thermal energy exchange potential of the water.

DRAWINGS

These and other features and advantages of the present invention will be appreciated as the same becomes better understood by reference to the following detailed description when considered in connection with the accompanying drawings wherein.

DESCRIPTION

Figure 1:
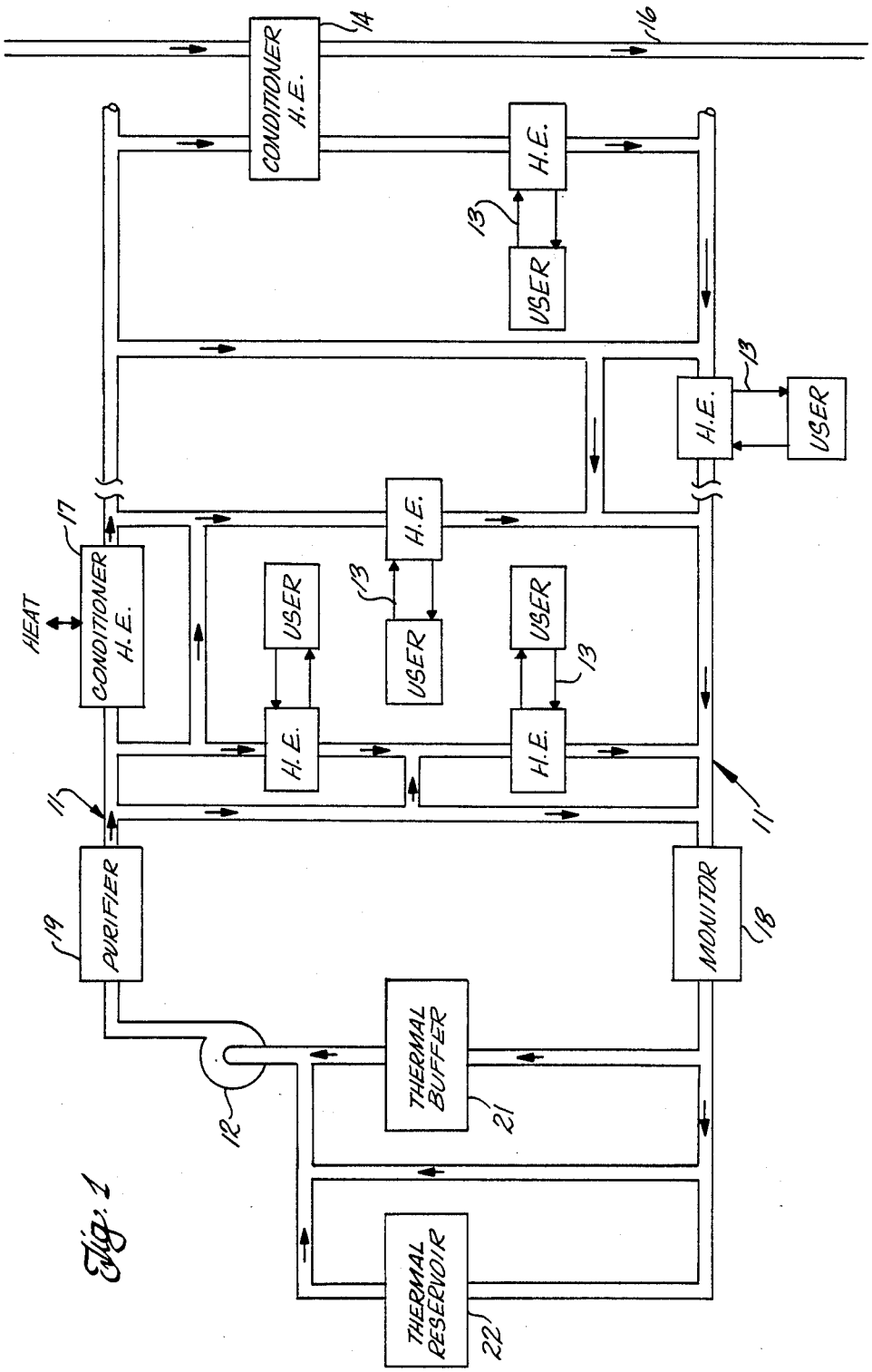
FIG. 1 is a schematic block diagram of an exemplary community thermal energy exchange system constructed according to principles of this invention.

A heat exchange system for utilizing low grade thermal energy exchange potential among a community of users is illustrated schematically in the block diagram of FIG. 1. It will become apparent that the system is but one of a variety of embodiments of community thermal energy exchange systems of the sort provided in practice of this invention. The configuration of such systems depends on the resources and users of such systems in a particular community. Significant variations may occur in the appropriate matching of resources and users.

Such a community thermal energy exchange system has a closed loop primary pipe system 11 which contains a primary heat transfer liquid. The preferred heat transfer liquid comprises water and may include nontoxic additives for controlling properties of the liquid. For example, propylene glycol may be used to reduce the freezing temperature and a variety of nontoxic corrosion inhibitors, buffers, chlorine and the like may be included. The properties sought in the heat transfer liquid include high heat capacity, nontoxicity, stability, and noncorrosivity to the pipes and other components of the system.

The primary heat transfer liquid is circulated through the primary heat transfer loop by a pump or pumps 12. Centrifugal, turbine or positive displacement pumps may be used as desired. Such pumps can be electrically driven, directly motor driven such as by a diesel engine, or may be operated by coupling to a fluid driven turbine in a municipal water main or the like. It should be apparent that the closed loop pipe system includes a number of conventional valves, and monitoring and control devices which are not illustrated in the schematic diagram of FIG. 1.

The primary heat transfer liquid is circulated through a plurality of heat exchangers labeled H.E. in the drawings. Each of the heat exchangers serves a user by way of a secondary pipe system 13 including a secondary heat transfer fluid. In the drawing the primary heat transfer pipe system is indicted by double lines and the secondary pipe system is indicated by single lines.

The users in a particular community may be any of a broad variety of businesses and industries. It is characteristic of a community of users that some of the users are heat sources which have excess low grade thermal energy to dissipate, whereas other users comprise heat sinks which utilize low grade thermal energy for heating. Thus, for example, a refrigeration plant may have excess heat from its compressors and a photographic processing operation may need to heat its chemical solutions. A bakery may have excess heat while other users need thermal energy for space heating. The mix of heat sources and heat sinks in a community differ according to the industrial and business mix of the community and may change from time to time. For example, seasonal variations may make space heating needed in the winter and cooling required in the summer.

In a community thermal energy exchange system the users of thermal energy exchange, whether as a heat source or a heat sink, are coupled to the primary heat transfer liquid by way of heat exchangers and secondary heat transfer fluids. The secondary heat transfer fluids can take a broad variety of forms depending on the user. Such a fluid may be the ammonia or freon of a refrigeration system, water or chemicals that need warming or cooling for various chemical processes, air to be used for space heating or cooling, or the like. The secondary heat transfer fluid conveys heat between each heat exchanger and the respective user. Such heat raises or lowers the temperature of the primary heat transfer liquid flowing through the heat exchanger.

In a community thermal energy exchange system users which are heat sources tend to increase the temperature of the primary heat transfer liquid while users which are heat sinks tend to lower the temperature of the heat transfer liquid. In a balanced mixture of system users, some of which are heat sinks and some of which are heat sources, temperature changes of the primary heat transfer liquid are limited. It is also desirable to conduct primary heat transfer liquid more or less directly between heat sources and heat sinks.

It will be apparent from the schematic illustration that a community thermal energy exchange system can be a highly branched system with the heat exchangers of various users being in both series and parallel arrangements. Generally speaking, parallel arrangements are preferred for a number of reasons, one of which is to keep the pressure requirements for liquid flow at reasonable levels. There are times, however, when it is desirable to place heat exchangers in series so that, for example, a heat source raises temperature of the primary heat transfer liquid upstream from the heat exchanger of a heat sink. With such serial arrangements the net temperature change in such a branch of the primary heat transfer loop is minimized.

Temperature of the primary heat transfer liquid in the user portion of the system may also be controlled by commingling liquid streams at different temperatures. Thus, for example, if a heat source unduly raises temperature of liquid in a branch of the system, unheated liquid circulating through the system may be commingled with effluent from the heat exchanger of the heat source.

It is desirable in a community thermal energy exchange system to maintain the average temperature of the primary heat transfer liquid in a controlled range. The range may vary according to seasons and conditions, and may be from about 1° C. to 35° C. Preferably the average temperature of the primary heat transfer liquid is maintained in the range of from 10° to 25° C. Portions of the liquid in branches of the system may be at higher or lower temperatures but a principal portion of the system is maintained within a limited temperature range.

To maintain such a limited temperature range within the system, a conditioner heat exchanger 14 may be advantageously employed. In the illustrated embodiment the conditioner heat exchanger 14 is in thermal contact with water in a municipal water main 16. A municipal water main may convey a large amount of water at uniform temperature. This water provides an outstanding source or sink of low grade thermal energy. By selectively utilizing the thermal energy potential of the municipal water, the temperature of the primary heat transfer liquid in the community thermal energy exchange system can be maintained in a narrow temperature range. For example, when the mix of users in a community thermal energy exchange system provides more heat input than output, temperature of the primary heat transfer liquid tends to rise. A portion of the primary heat transfer liquid is circulated through the conditioner heat exchanger to dissipate heat into the municipal water. A large amount of heat can be added to the municipal water without changing its temperature more than three or four degrees.

Similarly when the demand for thermal energy is high, such as when there are large space heating requirements during the winter, heat can be extracted from the municipal water by way of the conditioner heat exchanger to maintain the average temperature of the primary heat transfer liquid in the desired range.

In appropriate circumstances it can be desirable to include one or more additional conditioner heat exchangers 17 which may take a broad variety of forms. For example, such a conditioner heat exchanger may be a cooling tower which exchanges heat with the air, either by direct heat transfer or by evaporative cooling. Such a conditioner heat exchanger may be in contact with a low temperature fluid stream in a co-generation system heated by fossil fuels, or may be a directly fired boiler.

The conditioner heat exchangers may take a broad variety of other forms. Instead of using a municipal water main, heat may be transferred between the primary heat transfer liquid and irrigation water, fossil ground water, ground injection water, sewage, surface water, flood control streams, discharged fluids from industrial or power plants, ocean water, rivers, lakes, air, exhaust gases, or virtually any other source or sink of thermal energy.

Such conditioner heat exchangers are characterized by variable addition or subtraction of heat from the primary heat transfer liquid as required to maintain the average temperature of the heat transfer liquid in the desired range. This is to be compared with the users which, in general, operate at a given capacity or according to the demands of the user, rather than having as a primary purpose the control of the average temperature of the primary heat transfer liquid. In other words at the user heat exchangers the quantity of heat transferred depends on the demands of the user. At the conditioner heat exchangers the quantity of heat transferred is governed by the requirement to maintain the average temperature of the heat transfer liquid in a controlled range.

A municipal water main is a preferred heat transfer medium for a conditioner heat exchanger since mains are readily available throughout the community of users. Thus, conditioner heat exchangers may be provided in various branches of a municipal water system to be utilized or bypassed as required to maintain the desired temperature of the primary heat transfer liquid.

The utilization of municipal water supplies for this purpose makes it important that the primary heat transfer liquid be nontoxic. It is a prime responsibility of a municipal water system to protect the health and safety of its customers. Thus, the heat transfer liquid in any such conditioner heat exchanger must be nontoxic in the event of leakage. Contamination of the water supply cannot be tolerated. There are secondary heat transfer fluids utilized by many users which are toxic and contamination of the municipal water supply by such fluids must be avoided. A primary heat transfer liquid for conveying heat among a community of users provides two heat exchange interfaces both of which would need to be breached to contaminate a municipal water supply or another user's fluid stream with a toxic substance. Thus, the nontoxic primary heat transfer liquid provides a means for transferring heat without transferring contamination. Chemical monitors 18 in the primary heat transfer liquid sense contamination with undesirable materials such as secondary heat transfer fluid, rust, corrosion products or the like, so that any damaged heat exchangers can be shut off from the system until repaired or other remedial measures taken to avoid such contamination.

The monitor station 18 also senses temperature of the primary heat transfer liquid for controlling heat transfer at the conditioner heat exchangers. Control may be by changing the quantity of heat added or subtracted to liquid flowing through a conditioner heat exchanger 17, or by varying the flow of liquid through a conditioner heat exchanger 14, by heat transfer with a thermal reservoir 22 as hereinafter described, or a combination of such techniques. Additional temperature sensors may be provided elsewhere in the system for monitoring temperature and controlling flow of heat and liquid to maintain a desired average temperature.

Similarly, it is desirable to employ a purifier 19 in the primary heat transfer pipe system. Such a purifier may include filters for removing particulate contamination and chemical treatment devices such as chlorinators, or meters for adding nontoxic corrosion inhibitors.

A thermal buffer 21 is includes in the community thermal energy exchange system to help maintain the average temperature of the heat transfer liquid in the desired range. In an exemplary embodiment the thermal buffer is a large reservoir of primary heat transfer liquid, i.e. more than 10% of the volume of the circulating heat transfer liquid, having a temperature about the same as the average temperature of the heat transfer liquid being circulated. By having a large quantity of liquid in the buffer, the quantity of heat that can be transferred to or from the heat transfer liquid without exceeding its temperature limits can be enhanced.

If desired, the thermal buffer can be a solid heat bank. For example, a large mass of gravel or cobbles through which the heat transfer liquid is circulated can store a large amount of thermal energy and maintain the average temperature of the heat transfer liquid within the desired range. Phase change materials may also be advantageously used.

It can also be desirable to employ a thermal reservoir 22 in the community system. Such a thermal reservoir is at a temperature different from the average temperature of the heat transfer liquid for smoothing out diurnal or other changes in the demands on the system. The thermal reservoir may be a portion of the primary heat transfer liquid heated or cooled outside the desired control range during the night when system demands are low. During the day a portion of the heated or cooled liquid from the thermal reservoir may be commingled with circulating liquid to maintain the average temperature of the circulating liquid within the desired range.

Just as in the case of the thermal buffer, a solid heat storage medium may be employed. The thermal reservoir is characterized by having a temperature that at times is different from the average temperature of the primary heat transfer liquid. The thermal buffer on the other hand typically has a temperature about the same as the average temperature of the primary heat transfer liquid.

Any of a broad variety of conventional heat exchangers may be employed for transferring heat between the primary heat transfer liquid and the secondary heat transfer fluid. The heat eschange surfaces may be perforated plates, thin tubes, radiator cores, heat pumps, heat pipes, shell and tube type heat exchanges, cascade coolers, jackets, or any of a variety of other heat exchangers well known to those skilled in the art. The actual heat exchangers selected to some extent depend on the nature of the secondary heat transfer fluid employed by particular users, total heat flux, pressure drop, etc.

A community thermal energy exchange system operates somewhat like a public utility by providing low grade thermal energy exchange potential for dissipating or receiving heat, to a variety of users. The users of such a system pay for the cost of installing and operating the system by user charges based on the quantity of heat transferred. Thus, each of the heat exchangers between primary heat transfer liquid and secondary heat transfer fluid comprises means for metering the quantity of heat transferred.

Figure 2:
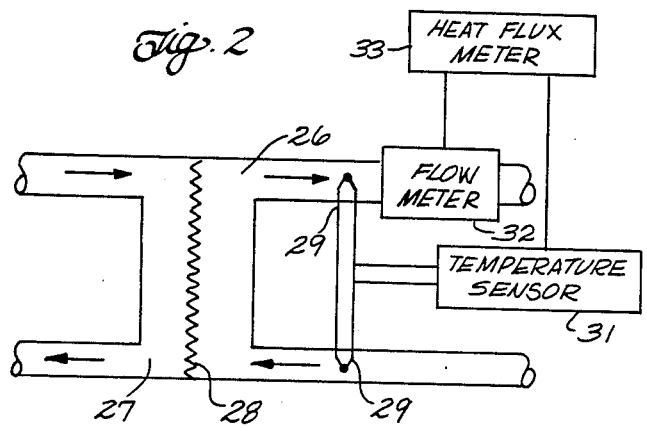
FIG. 2 illustrates schematically means for metering heat flux in the heat exchange system.

An exemplary metering arrangement is illustrated in FIG. 2. As illustrated in this embodiment primary heat transfer liquid is circulated through the primary side 26 of the heat exchanger. A secondary heat transfer fluid is circulated through the secondary side 27 of the heat exchanger. A heat transfer surface 28, indicated schematically, prevents commingling of the fluids while providing heat transfer. Thermocouples 29 or the like in the input and output lines on the primary side of the heat exchanger are connected to a temperature sensor 31. This provides a measure of the difference in temperature between the input and output liquid. A flow meter 32 is provided in one of the primary liquid pipes for measuring the quantity of liquid flowing through the heat exchanger.

By combining these measured parameters in a heat flux meter 33, the heat transferred to or from the system by a particular user can be measured. Thus, if desired, the rate charged that user depends on the quantity of heat transferred and may differ among users depending on the "quality" of heat. For example, a lower rate may be charged to a user constituting a heat sink than a user constituting a heat source. Many other financial arrangements can be made between the system operator and individual users. Users might pay on the basis of installed capacity of the heat exchangers in the system, or on the basis of the potential heat flux of the equipment or facilities connected to the system. They might pay flat fees. Different rates may be applicable when the user owns the heat exchange and related equipment as compared with ownership by the system operator. Direct payment may be dispensed with and other arrangements of mutual benefit to the parties may be adopted. The point is that the user "pays" for the heat transfer service received, usually in amounts based on actual or potential usage of the system. Thus, it will be understood that metering the amount of heat exchanged includes not only the most common heat flux metering, but other modes of determining compensation, as well.

In the illustrated embodiment the heat flux meter is provided on the primary heat transfer liquid side of the heat exchanger. This is preferable since the heat capacity of the primary heat transfer liquid is constant and well known and meter box calibration is straightforward. It may be desirable under some circumstances, however, to have the heat flux meter on the secondary heat transfer fluid side of the heat exchanger. Sensing of the parameters of the secondary heat transfer fluid may permit anticipation of changes in demand, or indications of deficient or excessive heat transfer for a particular user. Such information is useful for adjusting the system parameters to avoid changes rather than merely reacting to changes, such as temperature, in the system as a whole.

Figure 3:
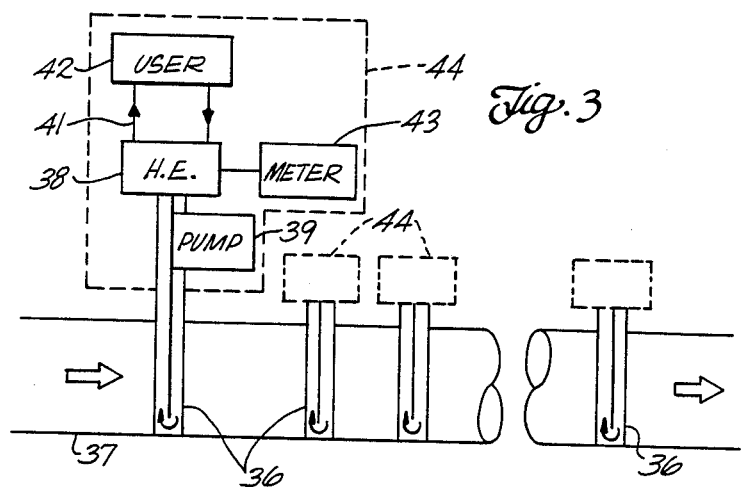
FIG. 3 illustrates in fragmentary schematic diagram a portion of an exemplary community thermal energy exchange system.

FIG. 3 illustrates schematically another embodiment of community thermal energy exchange system constructed according to principles of this invention. In this embodiment a plurality of similar conditioner heat exchangers 36 are mounted in a section of municipal water main 37 or the like. Each conditioner heat exchanger may be any of a broad variety of exchangers, as mentioned above, as appropriate.

Each conditioner heat exchanger 36 is connected to a secondary or primary heat exchanger 38. A pump 39 circulates a nontoxic primary heat transfer liquid through the primary heat transfer loop thus formed. A secondary heat transfer fluid is circulated through a secondary pipe system 41 interconnecting the primary heat exchanger 38 and a user 42. A heat flux meter 43 is connected to the primary heat exchanger 38 for monitoring the quantity of heat exchanged by the user. Only one of the subsystems 44 connecting a user and primary heat exchanger is illustrated in detail in FIG. 3. Other similar subsystems 44 are indicated by dashed boxes only.

It is desirable to employ a plurality of similar conditioner heat exchangers in the water main or the like. For example, a number of heat exchangers having a capacity of up to ten tons (120,000 BTU per hour) and another group of heat exchangers having a capacity of up to fifty tons may be provided in the water main. Such standard conditioner heat exchangers are interconnected to provide the capacity desired for a particular user. Thus, for example, in the embodiment illustrated in FIG. 4, user No. 1 which has a requirement for up to ten tons of heat exchange capacity is connected to one ten ton heat exchanger 36 in the water main 37. User No. 2, however, may need up to forty tons of heat exchange capacity and be connected to four ten ton heat exchangers in parallel. A third user needing up to one hundred tons of heat exchange capacity may be connected to two fifty ton conditioner heat exchangers 46. It will be understood that in the schematic illustration of FIG. 4 the conditioner exchangers are connected to primary heat exchangers as illustrated in FIG. 3.

Figure 4:
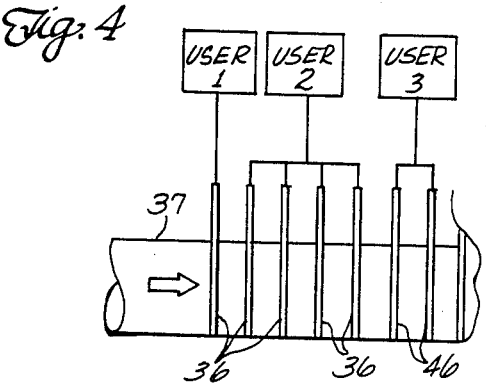
FIG. 4 illustrates even more schematically a portion of the exemplary embodiment of community thermal energy exchange system illustrated in FIG. 3.

An embodiment of community thermal energy exchange system as illustrated in FIGS. 3 and 4 provides the ability to more or less balance heat flux from users that have heat sources and users that have heat sinks to minimize the total temperature change in the water main. Each user exchanges heat with a primary heat exchanger and the heat so transferred is exchanged with the water in the main by way of the conditioner heat exchangers. A mix of users with heat sources and heat sinks tends to balance for limiting temperature changes in the water or other main 37. If desired a supplementary heat exchanger may be connected to the municipal water main for maintaining temperature of the water in a selected range. It will also be apparent that flow control through each primary heat transfer loop in this embodiment may be exercised for maintaining temperature of the water in the main in a desired range. Such an embodiment may also incorporate various temperature, flow or purity monitors, purifiers, means for making additives, thermal buffers, thermal reservoirs, and the like as mentioned above.

The use of heat exchange capacity by each user of the system is metered for billing and operating control purposes. Appropriate metering for billing may be based on actual or potential usage, or similar arrangements as outlined above. Such a system may be operated by the municipal water utility or may be operated by a separate entity.

The monitoring of such a community thermal energy exchange system using monitors 18, sensors 31, meters 32 and 33 or other sensors well known to those skilled in the art, can provide information for control of system operation to minimize total operating cost of such a system in combination with an electrical utility, for example. The incremental electrical power demand associated with increasing flow rate utilizing conditioner heat exchangers or the thermal reservoir can be computed. Similarly, the increased power demand by reason of not changing the system operating parameters, but instead permitting temperature deviation can also be computed. A decision can then be made whether it is more economical to permit deviation from the desired temperature or change system operation and thereby minimize total system operating costs and demand on the power grid.

Similar decisions can be made to minimize power demands by selective activation of primary heat transfer liquid conditioners. For example, it may be preferable to employ a thermal reservoir rather than a conditioner heat exchanger under certain circumstances. Controlled operation of the system can also facilitate "peak shaving" by reducing power demands at peak periods, and either charging a thermal reservoir or changing the average temperature of the heat transfer liquid during off peak periods.

Community thermal energy exchange systems can take a broad variety of forms as suggested by the permutations herein described and illustrated. Many other series and parallel configurations, liquid conditioners, flow paths and the like can be provided for the demands of a particular community of users. It is therefore to be understood that within the scope of the appended claims this invention may be practiced otherwise than as specifically described.

What is claimed is:

1. A community thermal energy exchange system comprising:
   a primary closed loop pipe system containing a primary heat transfer liquid;
   a plurality of primary heat exchangers connected to the pipe system;
   a plurality of thermal energy exchange system users;
   a secondary pipe system interconnecting each of such users and such a primary heat exchanger, each of such secondary pipe systems including a secondardy heat transfer fluid;
   a portion of such users performing cooling and hence comprising heat sources for transferring heat to such a secondary heat transfer fluid for transferring heat to the primary heat transfer liquid;
   a portion of such users performing heating and hence comprising heat sinks for receiving heat from such a secondary heat transfer fluid for receiving heat from the primary heat transfer liquid; and
   means for selectively exchanging heat in either direction between the primary heat transfer liquid and a fluid stream selected from the group consisting of municipal water, irrigation water, ground water, ground injection water, sewage, industrial effluent, power plant effluent, river water, sea water, lake water, and surface water, separately from said primary heat exchangers for maintaining the average temperature of the primary heat transfer liquid within a selected range.

2. A community thermal energy exchange system as recited in claim 1 comprising means for controlling average temperature of the primary heat transfer liquid in the range of from 10° to 25° C.

3. A community thermal energy exchange system as recited in claim 1 comprising buffer means for storing heat at approximately the same temperature as the average temperature of the primary heat transfer liquid.

4. A community thermal energy exchange system as recited in claim 3 wherein the buffer means comprises a reservoir containing a volume of primary heat transfer liquid in excess of ten percent of the circulating volume of primary heat transfer liquid.

5. A community thermal energy exchange system as recited in claim 1 comprising a thermal energy reservoir having a temperature different from the average temperature of the primary heat transfer liquid and means for exchanging heat between the primary heat transfer liquid and the reservoir.

6. A community thermal energy exchange system as recited in claim 5 wherein the thermal reservoir comprises a volume of primary heat transfer liquid at a temperature different from the average temperature of the circulating heat transfer liquid and means for commingling circulating heat transfer liquid and such liquid in the thermal reservoir, 7. A community thermal energy exchange system as recited in claim 5 wherein the thermal reservoir comprises a material seleted from the group consisting of insoluble minerals, phase change materails, water, brines and oils.

8. A community thermal energy exchange system comprising:
   a closed loop primary pipe system containing a primary heat transfer liquid;
   a plurality of primary heat exchangers connected to the pipe system;
   a plurality of thermal energy exchange system users;
   a secondary pipe system interconnecting each of such users and such a primary heat exchanger, each of such secondary pipe systems including a secondary heat transfer fluid;
   a portion of such secondary heat transfer fluids being at a lower temperature than the primary heat transfer liquid upstream from such a primary heat exchanger;
   a portion of such secondary heat transfer fluids being at a higher temperature than the primary heat transfer liquid upstream from such a secondary heat exchanger; and
   a fluid flow main;
   means for selectvely transferring heat to the primary heat transfer liquid from the fluid flow main for transferrring heat to the fluid flow main from the primary heat transfer liquid separately from said primary heat exchangers for maintaining the average temperature of the primary heat transfer liquid within a selected range.

9. A community thermal energy exchange system as recited in claim 8 comprising means for metering the quantity of heat transferred at each such heat exchanger.

10. A community thermal energy exchange system as recited in claim 8 wherein the means for selectively transferring heat comprises means for maintaining temperature within the range of from 10° to 25° C.

11. A community thermal energy exchange system as recited in claim 10 wherein such a means for selectively transferring heat comprises means for transferring heat between the primary heat transfer liquid and a fluid stream selected from the group consisting of municipal water, irrigation water, ground water, ground injection water, sewage, industrial effluent, power plant effluent, river water, sea water, lake water, and surface water.

12. A community thermal energy exchange system as recited in claim 8 comprising buffer means for storing heat at approximately the same temperature as the average temperature of the primary heat transfer liquid.

13. A community thermal energy exchange system as recited in claim 8 comprising a thermal energy reservoir having a temperature different from the average temperature of the primary heat transfer liquid.

14. A community thermal energy exchange system comprising:
   a municipal water main;
   a plurality of like conditioner heat exchangers in the main;
   a plurality of primary heat exchangers, each primary heat exchanger being connected to at least one conditioner heat exchanger by a closed loop pipe system;
   means for circulating water with no more than nontoxic additives as a primary heat exchange liquid through the pipe system; and
   a plurality of users of low grade thermal energy exchange potential, each user including means for passing a secondary heat transfer fluid through such a primary heat exchanger.

15. A community thermal energy exchange system as recited in claim 14 comprising means for interconnecting at least a portion of the primary heat exchangers in parallel for connection with one of such secondary heat exchangers.

16. A method for distributing thermal energy among a community of users comprising the steps of:
   exchanging heat between a supply of municipal water and primary heat transfer liquid in a plurality of closed loop systems;
   transferring heat between primary heat transfer liquid in a portion of such systems and a secondary heat transfer fluid at a lower temperature than primary heat transfer liquid, for a user of low grade thermal energy potential;
   transferring heat between primary heat transfer liquid in a portion of such systems and a secondary heat transfer fluid at a higher temperature than primary heat transfer liquid for a user of low grade thermal energy potential; and
   charging each user an amount related to the quantity of heat exchanged between the primary heat transfer liquid and the secondary heat transfer fluid.

17. A method as recited in claim 16 wherein the charging includes the step of measuring the flow rate of primary heat transfer liquid through a heat exchanger and measuring the difference in temperature between the inlet and outlet of such primary heat transfer liquid.

18. A method for distributing thermal energy among a community of users comprising the steps of:
   circulating a primary heat transfer liquid in a closed loop system passing through a plurality of heat exchangers;
   circulating secondary heat transfer fluid having a lower temperature than the primary heat transfer liquid through a plurality of such heat exchangers for heat exchange with the primary heat transfer liquid;
   circulating secondary heat transfer fluid having a higher temperature than the primary heat transfer liquid through a plurality of such heat exchangers for heat exchange with the primary heat transfer liquid; and
   selectively exchanging heat between the primary heat transfer liquid and a fluid flow main separately from said heat exchangers for maintaining the average temperature of the primary heat transfer liquid in a selected range.

19. A method as recited in claim 18 comprising maintaining the average temperature of the primary heat transfer liquid in the range of from 10° to 25° C.

20. A method as recited in claim 18 comprising metering quantity of heat transferred at such heat exchangers.

21. A method for distributing thermal energy among a community of users comprising the steps of:
   circulating a primary heat transfer liquid in a closed loop system passing through a plurality of heat exchangers;
   circulating secondary heat transfer fluids through a plurality of such heat exchangers for heat transfer between the primary heat transfer liquid and such secondary heat transfer fluids;
   transferring heat from a portion of such users to such secondary heat transfer fluids for transferring heat to the primary heat transfer liquid at a portion of such heat exchangers;
   transferring heat from the primary heat transfer liquid to such secondary heat transfer fluids at a portion of such heat exchangers for transferring heat from such secondary heat transfer fluids to such users; and
   selectively exchanging heat in either direction between a fluid flow main and the primary heat transfer liquid separately from such secondary heat transfer fluids for maintaining the average temperature of the primay heat transfer liquid within a selected range.

22. A method as recited in claim 21 comprising exchanging heat with a thermal energy reservoir at a temperature different from the average temperature of the circulating primary heat transfer liquid.

23. A method as recited in claim 22 wherein the step of exchanging heat with a thermal energy reservoir comprises the step of commingling at least a portion of primary heat transfer liquid from such a thermal energy reservoir with circulating primary heat transfer liquid.

24. A method as recited in claim 21 comprising charging each user an amount in proportion to the quantity of heat transferred between the primary heat transfer liquid and such a secondary heat transfer fluid.

25. A community thermal energy system as recited in claim 1 further comprising means for metering the quantity of heat transferred at each such primary heat exchanger.

26. A community thermal energy exchange system comprising:
   a fluid flow main;
   a plurality of thermal energy exchange system user loads;
   a plurality of primary closed loop pipe systems containing a primary heat transfer liquid for exchanging heat with such user loads, each such loop system comprising:
      a primary heat exchanger in heat exchange relation with a secondary heat transfer fluid;
      a user device in heat exchanger relation with a secondary heat transfer fluid; and
      means for circulating the primary heat transfer liquid;
   such user loads comprising both heat sinks for receiving heat from such a secondary heat transfer fluid for receiving heat from the primary heat transfer liquid and heat sources for transferring heat to such a secondary heat transfer fluid for transferring heat to the primary heat transfer liquid; and
   a conditioner heat exchanger in thermal exchange relation with the fluid flow main for selectively exchanging heat with the primary heat transfer liquid separately from said primary heat exchangers for maintaining the average temperature of the primary heat transfer liquid within a selected range.

27. A method as recited in claim 20 wherein the metering comprises measuring the flow rate of primary heat transfer liquid through such a heat exchanger and measuring the difference in temperature between the inlet and outlet of such primary heat transfer liquid.

28. A community thermal energy exchange system as recited in claim 26 wherein a plurality of such conditioner heat exchangers are substantially alike and comprising means for interconnecting such like heat exchangers in parallel.

29. A community thermal energy exchange system as recited in claim 26 wherein at least a portion of such user devices comprise heat sources for transferring heat to such a secondary heat transfer fluid for transferring heat to the primary heat transfer liquid, and at least a portion of such user devices comprise heat sinks for receiving heat from such a secondary heat transfer fluid for receiving heat from the primary heat transfer liquid.

30. A community thermal energy exchange system as recited in claim 26 comprising means for metering the quantity of heat transferred at such a heat exchanger.

* * * * *